United States Patent
Yamada

(10) Patent No.: US 10,800,873 B2
(45) Date of Patent: Oct. 13, 2020

(54) EPOXY RESIN CURING AGENTS, EPOXY RESIN COMPOSITIONS, EPOXY RESIN CURED PRODUCTS, AND METHODS OF PRODUCING EPOXY RESIN CURING AGENT

(71) Applicant: NAMICS CORPORATION, Niigata (JP)

(72) Inventor: Kazuyoshi Yamada, Niigata (JP)

(73) Assignee: NAMICS CORPORATION, Niigata (JP)

( * ) Notice: Subject to any disclaimer, the term of this patent is extended or adjusted under 35 U.S.C. 154(b) by 0 days.

(21) Appl. No.: 15/034,726

(22) PCT Filed: Dec. 12, 2014

(86) PCT No.: PCT/JP2014/083053
§ 371 (c)(1),
(2) Date: May 5, 2016

(87) PCT Pub. No.: WO2015/093417
PCT Pub. Date: Jun. 25, 2015

(65) Prior Publication Data
US 2016/0280845 A1    Sep. 29, 2016

(30) Foreign Application Priority Data

Dec. 16, 2013 (JP) ................................. 2013-259291

(51) Int. Cl.
*C08G 59/42* (2006.01)
*C08G 59/50* (2006.01)
(Continued)

(52) U.S. Cl.
CPC ......... *C08G 59/4261* (2013.01); *C08G 59/50* (2013.01); *C08G 59/5033* (2013.01); *C08L 63/00* (2013.01)

(58) Field of Classification Search
None
See application file for complete search history.

(56) References Cited

U.S. PATENT DOCUMENTS

2004/0034124 A1   2/2004   Court et al.
2007/0100071 A1   5/2007   Bonnet et al.
(Continued)

FOREIGN PATENT DOCUMENTS

EP   2036950 A1   3/2009
EP   2620460 A1   7/2013
(Continued)

OTHER PUBLICATIONS

Kar et al., "Amine-randomised poly(2-ethylhexyl acrylate) as impact and adhesive modifier for epoxy resin," Pigment & Resin Technology 32(2):69-77 (2003).
(Continued)

*Primary Examiner* — Rachel Kahn
*Assistant Examiner* — Ha S Nguyen
(74) *Attorney, Agent, or Firm* — Clark & Elbing LLP

(57) ABSTRACT

To provide a technique for producing an epoxy resin cured product having toughness and elasticity. (A) the amine curing agent (B) an epoxy resin curing agent characterized in that the acrylic block copolymer is dissolved.

8 Claims, 7 Drawing Sheets

(51) Int. Cl.
*C08L 63/00* (2006.01)
*C08L 33/06* (2006.01)

(56) References Cited

U.S. PATENT DOCUMENTS

| | | | | |
|---|---|---|---|---|
| 2008/0200589 A1* | 8/2008 | Hubschmid | ............ | C08L 53/00 523/436 |
| 2009/0198012 A1* | 8/2009 | Sakata | ............ | C08J 5/24 524/606 |
| 2010/0273958 A1* | 10/2010 | Schmidt | ............ | H05K 1/0353 525/92 H |
| 2011/0184091 A1* | 7/2011 | Mizuki | ............ | C08G 59/4238 523/428 |
| 2013/0202873 A1 | 8/2013 | Mizuki et al. | | |

FOREIGN PATENT DOCUMENTS

| | | | |
|---|---|---|---|
| JP | 2003-535181 A | | 11/2003 |
| JP | 2007-514872 A | | 6/2007 |
| JP | 2008-189794 A | | 8/2008 |
| JP | 2009-501258 A | | 1/2009 |
| JP | 2011-012168 A | | 1/2011 |
| JP | 2011-506679 A | | 3/2011 |
| JP | 2011079905 A | * | 4/2011 |
| JP | 2012-188651 A | | 10/2012 |
| WO | WO-01/092415 A1 | | 12/2001 |
| WO | WO-2005/052054 A1 | | 6/2005 |
| WO | WO-2007/009957 A1 | | 1/2007 |
| WO | WO-2008/001705 A1 | | 1/2008 |
| WO | WO-2009/076069 A1 | | 6/2009 |
| WO | WO-2009/101961 A1 | | 8/2009 |
| WO | WO-2012/039456 A1 | | 3/2012 |
| WO | WO-2012/046636 A1 | | 4/2012 |

OTHER PUBLICATIONS

International Search Report for International Patent Application No. PCT/JP2014/083053, dated Mar. 10, 2015 (5 pages) (English language translation provided).

Written Opinion of the International Searching Authority for International Patent Application No. PCT/JP2014/083053, dated Mar. 10, 2015 (5 pages) (No English language translation provided).

* cited by examiner

EPOXY RESIN CURING AGENTS, EPOXY RESIN COMPOSITIONS, EPOXY RESIN CURED PRODUCTS, AND METHODS OF PRODUCING EPOXY RESIN CURING AGENT

TECHNICAL FIELD

Embodiments of the present invention relate to epoxy resin curing agents, epoxy resin compositions, epoxy resin cured products, and methods of producing an epoxy resin curing agent.

BACKGROUND ART

Epoxy resins have excellent heat resistance, mechanical properties, electrical properties and adhesive properties. Epoxy resins are used as sealing materials for wiring boards, circuit boards and multilayer laminated circuit boards, semiconductor chips, coils, and electric circuits, while making the most of these properties. Epoxy resins are also used as resins in adhesives, paints, and fiber-reinforced resins.

However, since epoxy resins are usually brittle, there arises a problem that cracks are easily induced in them by, for example, stress-strain, heat, and mechanical impact during curing using a curing agent or during use.

With respect to these problems, rubber-elastic elastomers such as polybutadiene, polybutadiene acrylonitrile copolymers, polysiloxane, and acrylic block copolymers are introduced to toughen epoxy resins. However, such rubber-elastic elastomers have poor miscibility with epoxy resins; thus, their introduction results in a larger phase-separated structure. Furthermore, epoxy resins containing such rubber-elastic elastomers do not have sufficient toughness and elasticity.

For example, Patent Document 1 describes liquid sealing resin compositions containing a liquid epoxy resin, an amine curing agent, an acrylic resin, and an inorganic filler. However, this liquid sealing resin composition of Patent Document 1 has disadvantages of a larger phase-separated structure and a low elastic modulus.

Alternatively, Patent Document 2 describes curable resin compositions (resin cured products) containing an epoxy resin, an amine curing agent, and an acrylic block copolymer (see, in particular, Examples 13-15). However, as apparent from the results of Examples in Patent Document 2, compared with products obtained using a phenol novolac resin as a curing agent, a resin cured product obtained using an amine curing agent has a problem of a low fracture toughness value.

PRIOR ART DOCUMENT

Patent Document

Patent Document 1: International patent publication No. 2012/046636
Patent Document 2: International patent publication 2009/101961

SUMMARY OF THE INVENTION

Problems to be Solved by the Invention

The present invention was made to solve the aforementioned problems, and an object thereof is to provide a technique for producing an epoxy resin cured product having toughness and elasticity.

Means to Solve the Problems

The present inventor has found that it is possible to maintain the elasticity of cured epoxy resin products while increasing the toughness of them by using, for epoxy resins, a curing agent obtained by dissolving an acrylic block copolymer into an amine curing agent. The present invention was completed based on these findings.

The present invention is as follows.

In an epoxy resin curing agent according to item 1, an acrylic block copolymer (B) is dissolved in an amine curing agent (A).

An epoxy resin curing agent according to item 2 is the epoxy resin curing agent according to item 1, wherein 1 to 100 parts of the acrylic block copolymer (B) is dissolved by heating relative to 100 parts of the amine curing agent (A).

The epoxy resin curing agent according to item 3 is the epoxy resin curing agent according to item 1 or 2, wherein a weight average molecular weight of the acrylic block copolymer (B) is 30,000 to 200,000.

The epoxy resin curing agent according to item 4 is the epoxy resin curing agent according to any one of items 1 to 3, wherein the acrylic block copolymer (B) is a diblock copolymer of polymer block A (C)-polymer block B (D), or a triblock copolymer of polymer block A (C)-polymer block B (D) polymer block A (C).

The epoxy resin curing agent according to item 5 is the epoxy resin curing agent according to item 4, wherein the content ratio of the polymer block A (C) in the acrylic block copolymer (B) is 10% to 70% by weight.

The epoxy resin curing agent according to item 6 is the epoxy resin curing agent according to item 4 or 5, wherein a part of the polymer block A (C) is modified into a carboxylic acid, and a part of the modified carboxylic acid is modified into an amide compound.

The epoxy resin curing agent according to item 7 is the epoxy resin curing agent according to any one of items 4 to 6, wherein the polymer block A (C) is poly (methyl methacrylate).

The epoxy resin curing agent according to item 8 is the epoxy resin curing agent according to any one of items 4 to 7, wherein the polymer block B (D) is poly(n-butyl acrylate).

The epoxy resin curing agent according to item 9 is the epoxy resin curing agent according to any one of items 1 to 8, wherein the amine curing agent (A) is an aromatic amine curing agent.

An epoxy resin composition according to item 10 includes an epoxy resin curing agent according to any one of items 1 to 9, and an epoxy resin (E).

The epoxy resin composition according to item 11 is the epoxy resin composition according to item 10, further including an inorganic filler.

An epoxy resin cured product according to item 12 is the one obtained by curing an epoxy resin composition including an epoxy resin (E) and an epoxy resin curing agent wherein an acrylic block copolymer (B) is dissolved in an amine curing agent (A). The acrylic block copolymer (B) is a diblock copolymer of polymer block A (C)-polymer block B (D), or a triblock copolymer of polymer block A (C)-polymer block B (D-polymer block A (C). The polymer block B (D) is phase-separated in the epoxy resin cured product in a size of less than 1 μm.

A method of producing an epoxy resin curing agent according to item 13 includes: dissolving an acrylic block copolymer (B) into an amine curing agent (A) under conditions of temperature of 170° C. to 220° C. for 1 to 16 hours.

The method of producing an epoxy resin curing agent according to item 14 is the method of producing an epoxy resin curing agent according to item 13, wherein, by dissolving the acrylic block copolymer (B) into the amine curing agent (A), a part of a polymer block A (C) forming the acrylic block copolymer (B) is hydrolyzed and modified into a carboxyl acid, and a part of the modified carboxylic acid and the amine curing agent (A) are condensed by dehydration to produce an epoxy resin curing agent modified into an amide compound.

Effect of the Invention

Epoxy resin curing agent of the present invention is obtained by dissolving the (B) acrylic block copolymer (A) an amine curing agent. Cured epoxy resin cured by such an epoxy resin curing agent has toughness and elasticity.

MODES FOR CARRYING OUT THE INVENTION

Figure 1A:
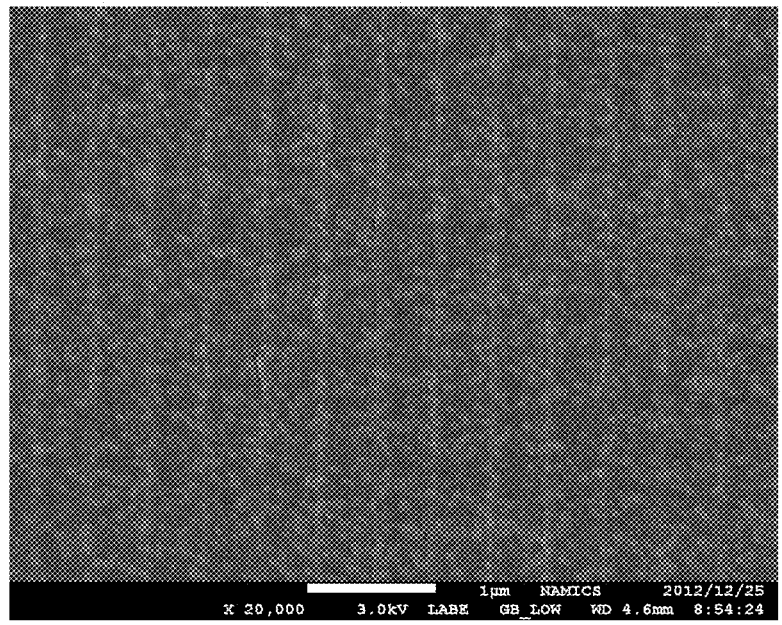
FIG. 1A A photograph of a phase-separated structure of Example 8 which was taken using a field emission scanning electron microscope.

The present invention is an epoxy resin curing agent in which acrylic block copolymer (B) is dissolved in an amine curing agent (A). Epoxy resin curing agents are used to cure an epoxy resin (E). A resin composition (resin cured product) of the present invention is an epoxy resin composition (epoxy resin cured product) which is mainly composed of the epoxy resin (E).

Amine Curing Agent

The amine curing agent (A) is not limited in its structure as long as it can cure the epoxy resin (E). As the amine curing agent (A), for example, an aliphatic amine curing agent or an aromatic amine curing agent can be used.

Examples of aromatic amine curing agents include diaminodiphenylmethane (4,4'-methylenedianiline, MDA), m-phenylenediamine (MPDA), diaminodiphenyl sulfone (DDS), diethyltoluenediamine (DETDA), diaminodiphenylmethane (DDM), 3,3'-diethyl-4,4'-diaminodiphenylmethane, 4,4'-methylenebis(N-methylaniline), trimethylenebis(4-aminobenzoate), polytetramethylene oxide-di-P-aminobenzoate, methylenebis(2-ethyl-6-methylaniline), 4,4'-methylenebis(2,6-dimethylaniline), and 4,4'-methylenebis(2,6-diethylaniline). In particular, diethyltoluenediamine and 3,3'-diethyl-4,4'-diaminodiphenylmethane, which are in liquid form at normal temperature, are preferred because they can readily be mixed with the acrylic block copolymer (B). As the amine curing agent (A), an amine curing agent may be used alone or, alternatively, a mixture of two or more different amine curing agents may be used.

Acrylic Block Copolymer

The acrylic block copolymer (B) is not limited in its structure as long as it is soluble in the amine curing agent (A). The weight average molecular weight (Mw) of the acrylic block copolymer (B) is preferably between 30,000 and 200,000. The acrylic block copolymer (B) is preferably a diblock copolymer of polymer block A (C)-polymer block B (D), or a triblock copolymer of polymer block A (C)-polymer block B (D)-polymer block A (C). As the acrylic block copolymer (B), an acrylic block copolymer may be used alone or, alternatively, a mixture of two or more different acrylic block copolymers may be used.

The polymer block A (C) has rigidity (hard segment). The content rate of the polymer block A (C) in the acrylic block copolymer (B) is preferably between 10% and 70% by weight. When the content rate of the polymer block A is higher, the fracture toughness value of the epoxy resin cured product cannot be improved. On the contrary, when the content rate of the polymer block A is lower, the compatibility of the copolymer with the epoxy resin is reduced.

Examples of the polymer block A (C) include poly(methyl methacrylate), poly(ethyl methacrylate) poly(propyl methacrylate), poly(n-butyl methacrylate), and poly(glycidyl methacrylate). The polymer block A (C) is preferably a poly(methyl methacrylate). For the polymer block A (C), a modified polymer block (e.g., a copolymer obtained by modifying methyl methacrylate with a water-soluble monomer) can also be used.

The polymer block B (D) has stretchability (flexibility) (soft segment). Examples of the polymer block B (D) include poly(ethyl acrylate), poly(n-butyl acrylate), poly (octyl acrylate), and poly(2-ethylhexyl acrylate). The polymer block B (D) is preferably poly(n-butyl acrylate)

Epoxy Resin Curing Agent

The epoxy resin curing agent according to the present invention is obtained by dissolving the acrylic block copolymer (B) in the amine curing agent (A). The epoxy resin curing agent is not specifically limited in its structure as long as it can cure the epoxy resin (E) and is the one obtained by dissolving the acrylic block copolymer (B) in the amine curing agent (A). Furthermore, other curing agent(s) and/or copolymer(s) may be used in combination with the epoxy resin curing agent, provided that the effects of the present invention can be achieved.

It is preferable that the acrylic block copolymer (B) is dissolved in the amine curing agent (A) under heating conditions for a predetermined time. For example, it is preferable that the acrylic block copolymer (B) is dissolved in the amine curing agent (A) under conditions of temperature of 170° C. to 220° C. for 1 to 16 hours. More preferably, it is heated at a temperature of 190° C. to 200° C. The temperature during heating is preferably set so as not to exceed the boiling point of the amine curing agent (A). When the amine curing agent (A) and the acrylic block copolymer (B) are mixed with each other, it is preferable that from 1 to 100 parts of the acrylic block copolymer (B) is dissolved in 100 parts of the amine curing agent (A). An epoxy resin curing agent with components mixed in these proportions suppresses the decrease in the elastic modulus of the epoxy resin cured product obtained using the epoxy resin curing agent in question.

Epoxy Resin

The epoxy resin (E) of the present invention is not limited in molecular weight and structure as long as it has two or more epoxy groups per molecule. Examples of the epoxy resin (E) include novolac epoxy resins such as phenol novolac epoxy resins and cresol novolac epoxy resins, bisphenol epoxy resins such as bisphenol-A epoxy resins and bisphenol-F epoxy resins, aromatic glycidyl amine-based epoxy resins such as N,N-diglycidylaniline, N,N-diglycidyl toluidine, diaminodiphenylmethane glycidyl amine, and aminophenol glycidyl amine, hydroquinone epoxy resins, biphenyl epoxy resins, stilbene epoxy resins, triphenolmethane epoxy resins, triphenolpropane epoxy resins, alkyl-modified triphenolmethane epoxy resins, triazine nucleus-containing epoxy resins, dicyclopentadiene-modified phenolic epoxy resins, naphthol epoxy resins, naphthalene epoxy resins, aralkyl-type epoxy resins such as phenol aralkyl epoxy resin with a phenylene and/or biphenylene skeleton and naphthol aralkyl epoxy resins with a phenylene and/or biphenylene skeleton, and aliphatic epoxy resins such as alicyclic epoxy including vinylcyclohexene dioxide, dicyclopentadiene oxide, and alicyclic diepoxy adipate. The epoxy resin (E) is preferably in liquid form so that it can readily be mixed with the epoxy resin curing agent. Specifically, the epoxy resin (E) is preferably bisphenol-F epoxy resin that is in liquid form at room temperature. As the of epoxy resin (E), an epoxy resin may be used alone or, alternatively, a mixture of two or more different epoxy resins may be used. Furthermore, other resin(s) may be used in combination with the epoxy resin(s), provided that the effects of the present invention can be achieved.

Epoxy Resin Composition and Epoxy Resin Cured Product

The epoxy resin composition of the present invention contains the above-mentioned epoxy resin curing agent and the epoxy resin (E). The method of producing the epoxy resin composition is not specificaily limited as long as it can provide a composition in which the above-described epoxy resin curing agent and the epoxy resin (E) are uniformly mixed.

Furthermore, the epoxy resin composition may contain inorganic fillers as fillers. In addition, the epoxy resin composition may contain additives, if necessary, to a degree not to impair the effects of the present invention.

The epoxy resin cured product of the present invention is obtained by curing the aforementioned epoxy resin composition. The epoxy resin cured product of the present invention has a microphase-separated structure. A microphase-separated structure is a structure where two or more different polymer components are mixed at a microscopic level (less than 1 μm, which is the maximum diameter when the polymer is in a particle shape and is the maximum diameter of a rod when the polymer is in a rod shape; the maximum diameter of a rod is a diameter of a circle circumscribing the linear phase-separated structure) without being miscible with each other. An epoxy resin cured product with a microphase-separated structure has high fracture toughness. Furthermore, since the polymer block B, which is a soft segment, is uniformly dispersed in the microphase-separated structure, the epoxy resin cured product with a microphase-separated structure is elastic. The method of producing a cured epoxy resin product of the present invention is not specifically limited as long as the microphase-separated structure is formed.

More specifically, a microphase-separated structure refers to a structure where the polymer block B (D), with a size of less than 1 μm, is phase-separated in the epoxy resin cured product. The polymer block B (D) is typically phase-separated with sizes of from a few nanometers to 500 nanometers. Moreover, it is preferable that the polymer block B (D) is phase-separated with sizes of 200 nm or less.

Note that a macrophase-separated structure is a structure where two or more different polymer components are mixed at a microscopic level (1 to 1000 μm, which is the maximum diameter when the polymer is in a particle shape and is the maximum diameter of a rod when the polymer is in a rod shape) without being miscible with each other.

The method of analyzing the phase-separated structure of the epoxy resin cured product is not specifically limited as long as it is possible to determine whether the structure is a microphase-separated structure or a macrophase-separated structure. For example, the phase-separated structure can be examined by staining the surface of the epoxy resin cured product with a dye (e.g., ruthenium tetroxide ($RuO_4$)) and observing it using a field emission-scanning electron microscope (FE-SEM). When ruthenium tetroxide is used as a dye, the polymer block B is stained but the polymer block A is not. Accordingly, when a dye that stains only a certain polymer block or blocks is used, the analysis of the phase-separated structure means measurement of the size of phase separation of the dyed polymer block.

The epoxy resin cured product of the present invention has toughness and elasticity, making it suitable for application in various fields. For example, the epoxy resin composition of the present invention can suitably be used as a semiconductor sealing material, in particular, as under-fill material.

EXAMPLES

Comparisons of Phase-Separated Structure, Fracture Toughness, and Elastic Modulus For the following Examples 1-7 and Comparative Examples 1-4, phase-separated structures were observed and fracture toughness values and elastic modulus were measured.

The amine curing agent used was one of aromatic amine curing agents having a primary amino group given below.
"Kayahard AA" (HDAA), manufactured by Nippon Kayaku Co., Ltd.
Diaminodiphenylmethane (DDM)
Diethyltoluenediamine (DETDA)

The acrylic block copolymer used was one of the following tri-block copolymers in which the polymer block A is PMMA (poly(methyl methacrylate), glass transition temperature: 100° C. to 120° C.), and the polymer block B is PnBA (poly(n-butyl acrylate), glass transition temperature: −40° C. to −50° C.).
"LA2140e", manufactured by Kuraray Co., Ltd. PMMA content of 20 wt. %, weight-average molecular weight (Mw)=80000
"LA2250", manufactured by Kuraray Co., Ltd. PMMA content of 30 wt. %, the weight-average molecular weight (Mw)=80000
"LA4285", manufactured by Kuraray Co., Ltd. PMMA content of 50 wt. %, the weight-average molecular weight (Mw)=80000

As the epoxy resin, bisphenol-F liquid epoxy resin ("YDF-8170", manufactured by Nippon Steel Sumitomo Metals Co., Ltd.) was used for all cases.

Example 1

14 parts of "LA4285" relative to 100 parts of "Kayahard AA" were placed in a vessel, which was immersed in an oil bath set at 180° C., and the content of the vessel was stirred for 2 hours. Thereafter, the vessel was taken out from the oil bath and cooled to room temperature to prepare an epoxy resin curing agent "a".

44.8 parts of the epoxy resin curing agent "a" was blended with 100 parts of epoxy resin to prepare a liquid epoxy resin composition.

Example 2

14 parts of "LA4285" relative to 100 parts of "Kayahard AA" were placed in a vessel, which was immersed in an oil bath set at 190° C. and the content of the vessel was stirred for 4 hours. Thereafter, the vessel was taken out from the oil bath and cooled to room temperature to prepare an epoxy resin curing agent "b".

44.8 parts of the epoxy resin curing agent "b" was blended with 100 parts of epoxy resin to prepare a liquid epoxy resin composition.

Example 3

14 parts of "LA2250" relative to 100 parts of "Kayahard AA" were placed in a vessel, which was immersed in an oil bath set at 190° C. and the content of the vessel was stirred for 4 hours. Thereafter, the vessel was taken out from the oil bath and cooled to room temperature to prepare an epoxy resin curing agent "c".

44.8 parts of the epoxy resin curing agent "c" was blended with 100 parts of epoxy resin to prepare a liquid epoxy resin composition.

Example 4

14 parts of "LA2140e" relative to 100 parts of "Kayahard AA" were placed in a vessel, which was immersed in an oil bath set at 190° C. and the content of the vessel was stirred for 4 hours. Thereafter, the vessel was taken out from the oil bath and cooled to room temperature to prepare an epoxy resin curing agent "d".

44.8 parts of the epoxy resin curing agent "d" was blended with 100 parts of epoxy resin to prepare a liquid epoxy resin composition.

Example 5

14 parts of "LA2140e" relative to 100 parts of "Kayahard AA" were placed in a vessel, which was immersed in an oil bath set at 200° C. and the content of the vessel was stirred for 4 hours. Thereafter, the vessel was taken out from the oil bath and cooled to room temperature to prepare an epoxy resin curing agent "e".

44.8 parts of the epoxy resin curing agent "e" was blended with 100 parts of epoxy resin to prepare a liquid epoxy resin composition.

Example 6

18 parts of "LA2140e" relative to 100 parts of diethyltoluenediamine were placed in a vessel, which was immersed in an oil bath set at 190° C. and the content of the vessel was stirred for 4 hours. Thereafter, the vessel was taken out from the oil bath and cooled to room temperature to prepare an epoxy resin curing agent "f".

32.8 parts of the epoxy resin curing agent "f" was blended with 100 parts of epoxy resin to prepare a liquid epoxy resin composition.

Example 7

16 parts of "LA2140e" relative to 100 parts of diaminodiphenylmethane were placed in a vessel, which was immersed in an oil bath set at 200° C. and the content of the vessel was stirred for 4 hours. Thereafter, the vessel was taken out from the oil bath and cooled to room temperature to prepare an epoxy resin curing agent "g".

36 parts of the epoxy resin curing agent "g" was blended with 100 parts of epoxy resin to prepare a liquid epoxy resin composition.

Comparative Example 1

100 parts of epoxy resin and 5.4 parts of LA4285" were placed in a vessel, which was immersed in an oil bath set at 180° C. and the content of the vessel was stirred for 2 hours. Then, 39.4 parts of "Kayahard AA" were blended to prepare a liquid epoxy resin composition.

Comparative Example 2

100 parts of epoxy resin and 5.4 parts of "LA2250" were placed in a vessel, which was immersed in an oil bath set at 180° C. and the content of the vessel was stirred for 2 hours. Then, 39.4 parts of "Kayahard AA" were blended to prepare a liquid epoxy resin composition.

Comparative Example 3

100 parts of epoxy resin and 5 parts of "LA2140e" were placed in a vessel, which was immersed in an oil bath set at 180° C. and the content of the vessel was stirred for 2 hours. Then, 27.8 parts of diethyltoluenediamine were blended to prepare a liquid epoxy resin composition.

Comparative Example 4

100 parts of epoxy resin and 39.4 parts of "Kayahard AA" were blended to prepare a liquid epoxy resin composition.

Analysis of Phase-Separated Structures

Analysis of phase-separated structures was performed as follows. First, the epoxy resin compositions prepared in Examples 1 to 7 and Comparative Examples 1 to 4 were cured (curing conditions: temperature 165° C., 2 hours) to a plate shape and the surfaces of the resulting epoxy resin cured products were smoothened with a microtome. These surfaces were stained by exposing them to steam of ruthenium tetroxide ($RuO_4$). Then, the surfaces of the stained epoxy resin cured products were observed with a field emission-scanning electron microscope (FE-SEM) to determine the size of the polymer block B.

Measurement of Elastic Modulus

For the measurement of elastic modulus (Gpa), the elastic modulus at normal temperature (25° C.) was measured using a viscoelasticity measuring device (Dynamic Mechanical Analyzer, DMA) for epoxy resin cured products similar to those obtained for the analysis of the phase-separated structures.

Measurement of Fracture Toughness

For the measurement of fracture toughness values ($MPam^{1/2}$), test specimens each having 57.2 mm in length by 13.0 mm in width by 6.5 mm in thickness were made for epoxy resin cured products similar to those obtained for the analysis of the phase-separated structures, and the fracture toughness values were measured on these test specimens using a Shimadzu Autograph AG-IS (manufactured by Shimadzu Corporation) according to ASTM D-5045-91 (Standeard Test Methods for Plane-Strain Fracture Toughness and Strain Energy Release Rate of Plastic Materials). At that time, each prepared specimen was cracked with a razor blade in the thickness direction at a central portion of the specimen. The initial crack lengths from five different regions were measured using a reading microscope with resolution of 0.01 mm and magnification of 50, and the average values of these measurements were obtained. The resulting crack lengths were in the range of 5.8 mm to 6.9 mm.

As shown in Table 1, Examples 1 to 7 has a microphase-separated structure, and a high value of fracture toughness. On the other hand, Comparative Examples 1 to 3 has a macrophase-separated structure, and a low value of fracture toughness. Examples 1-7 have an elastic modulus comparable to those of Comparative Examples 1 to 4. Since comparative Example 4 has no blended block copolymer, the cured product becomes uniform and no phase-separated structure is formed.

Comparison of the Phase-Separated Structure and Fracture Toughness Value Due to the Difference in the Formulation of the Acrylic Block Copolymer For the following Examples 8-10 and Comparative Example 5, phase-separated structures and fracture toughness values were measured. The amine curing agent used was "Kayahard AA." manufactured by Nippon Kayaku Co., Ltd. The acrylic block copolymer used was "LA4285" manufactured by Kuraray Co., Ltd. The epoxy resin used was "YDF-8170" manufactured by Nippon Steel Sumitomo Metals Co., Ltd.

Example 8

14 parts of "LA4285" relative to 100 parts of "Kayahard AA" were placed in a vessel, which was immersed in an oil bath set at 170° C. and the content of the vessel was stirred for 2 hours. Thereafter, the vessel was taken out from the oil bath and cooled to room temperature to prepare an epoxy resin curing agent "h".

44.8 parts of the epoxy resin curing agent "h" was blended with 100 parts of epoxy resin to prepare a liquid epoxy resin composition.

Example 9 (Same as Example 1)

14 parts of "LA4285" relative to 100 parts of "Kayahard AA" were placed in a vessel, which was immersed in an oil bath set at 180° C. and the content of the vessel was stirred for 2 hours. Thereafter, the vessel was taken out from the oil bath and cooled to room temperature to prepare an epoxy resin curing agent "a".

44.8 parts of the epoxy resin curing agent "a" was blended with 100 parts of epoxy resin to prepare a liquid epoxy resin composition.

TABLE 1

|  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
|---|---|---|---|---|---|---|---|---|---|---|---|
| Epoxy resin (YDF-8170) | 100 | 100 | 100 | 100 | 100 | 100 | 100 | 100 | 100 | 100 | 100 |
| Epoxy resin curing agent "a" | 44.8 | | | | | | | | | | |
| Epoxy resin curing agent "b" | | 44.8 | | | | | | | | | |
| Epoxy resin curing agent "c" | | | 44.8 | | | | | | | | |
| Epoxy resin curing agent "d" | | | | 44.8 | | | | | | | |
| Epoxy resin curing agent "e" | | | | | 44.8 | | | | | | |
| Epoxy resin curing agent "f" | | | | | | 32.8 | | | | | |
| Epoxy resin curing agent "g" | | | | | | | 36 | | | | |
| Amine curing agent (HDAA) | | | | | | | | 39.4 | 39.4 | | 39.4 |
| Amine curing agent (DETDA) | | | | | | | | | | 27.8 | |
| Acrylic block copolymer (LA4285) | | | | | | | | 5.4 | | | |
| Acrylic block copolymer (LA2250) | | | | | | | | | 5.4 | | |
| Acrylic block copolymer (LA2140e) | | | | | | | | | | 5 | |
| Phase-separated structure | micro | micro | micro | micro | micro | micro | micro | macro | macro | macro | macro |
| Elasticity (Gpa) | 3.7 | 3.7 | 3.6 | 3.6 | 3.6 | 3.3 | 3.4 | 3.0 | 2.4 | 2.0 | 3.6 |
| Fracture toughness value ($MPam^{1/2}$) | 1.6 | 1.6 | 1.7 | 1.8 | 1.8 | 1.8 | 1.6 | 0.9 | 0.8 | 0.8 | 0.8 |

Example 10

14 parts of "LA4285" relative to 100 parts of "Kayahard AA" were placed in a vessel, which was immersed in an oil bath set at 190° C. and the content of the vessel was stirred for 2 hours. Thereafter, the vessel was taken out from the oil bath and cooled to room temperature to prepare an epoxy resin curing agent "i".

44.8 parts of the epoxy resin curing agent "i" was blended with 100 parts of epoxy resin to prepare a liquid epoxy resin composition.

Comparative Example 5 (Same as Comparative Example 1)

100 parts of epoxy resin and 5.4 parts of "LA4285" were placed in a vessel, which was immersed in an oil bath set at 180° C. and the content of the vessel was stirred for 2 hours. Then, 39.4 parts of "Kayahard AA" were blended to prepare a liquid epoxy resin composition.

Figure 1B:
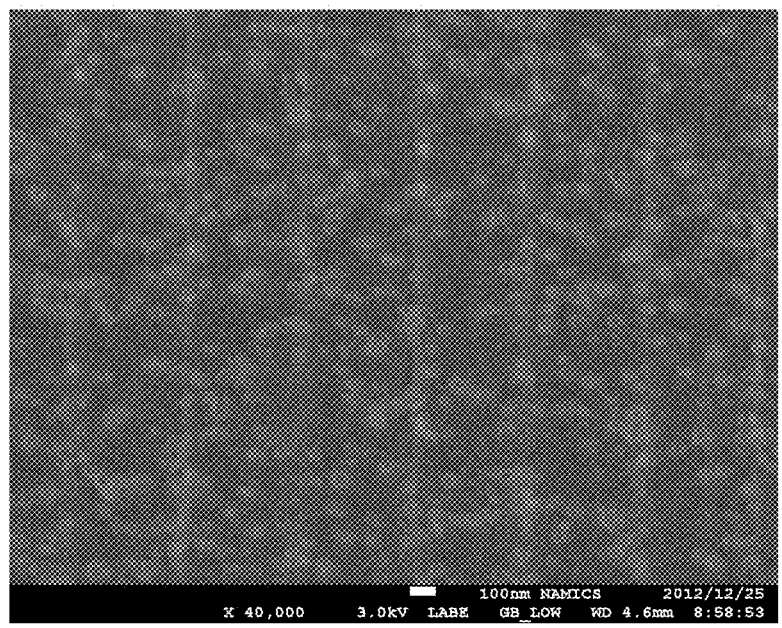
FIG. 1B A photograph of a phase-separated structure of Example 8 which was taken using a field emission scanning electron microscope.
Figure 2A:
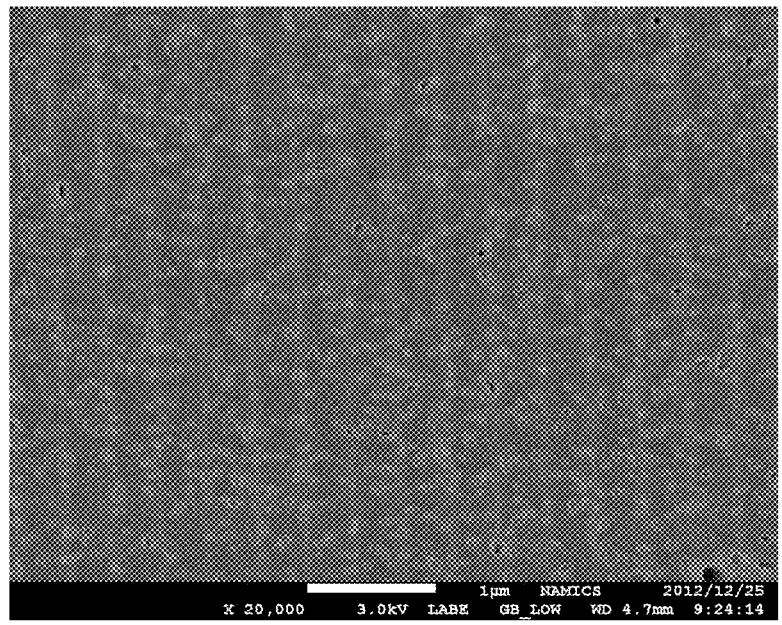
FIG. 2A A photograph of a phase-separated structure of Example 9 which was taken using a field emission scanning electron microscope.
Figure 2B:
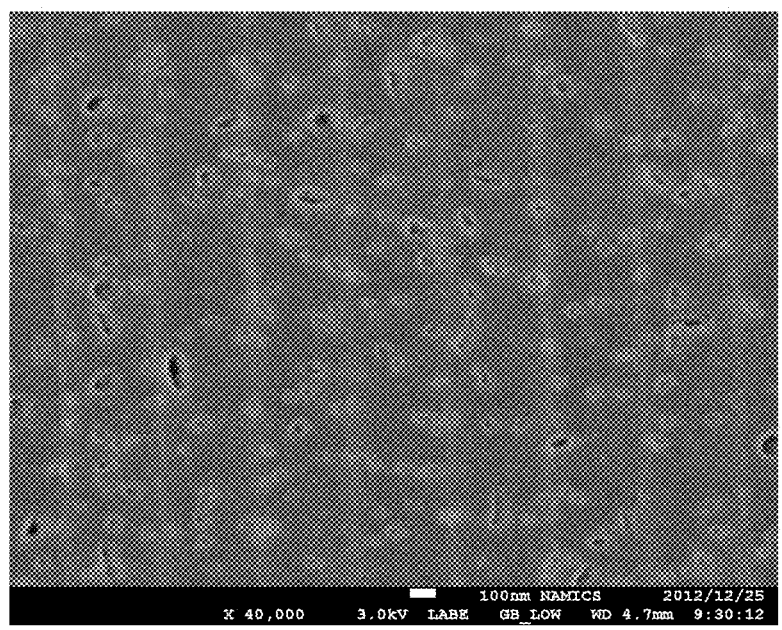
FIG. 2B A photograph of a phase-separated structure of Example 9 which was taken using a field emission scanning electron microscope.
Figure 3A:
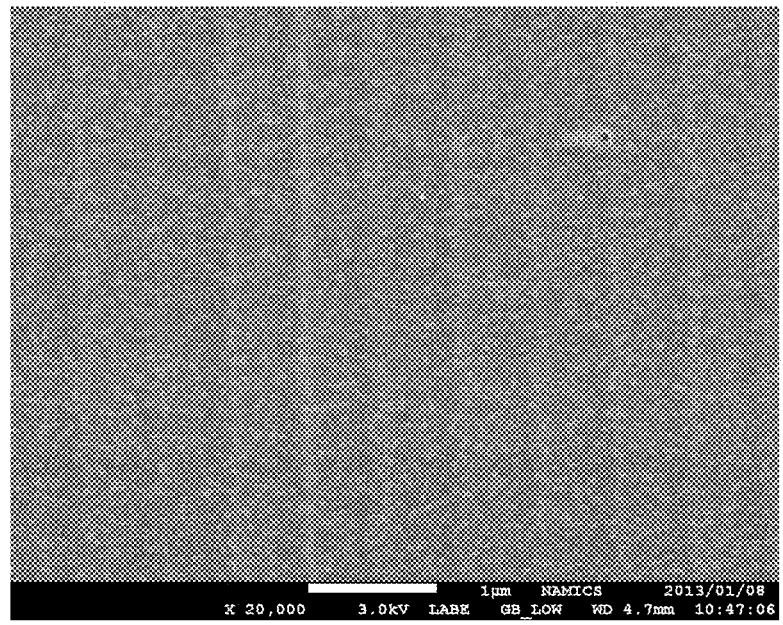
FIG. 3A A photograph of a phase-separated structure of Example 10 which was taken using a field emission scanning electron microscope.
Figure 3B:
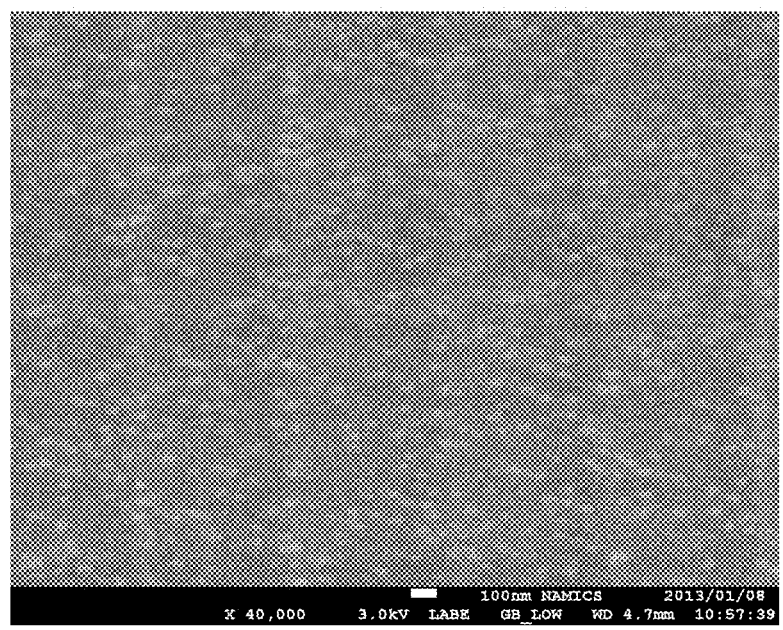
FIG. 3B A photograph of a phase-separated structure of Example 10 which was taken using a field emission scanning electron microscope.
Figure 4:
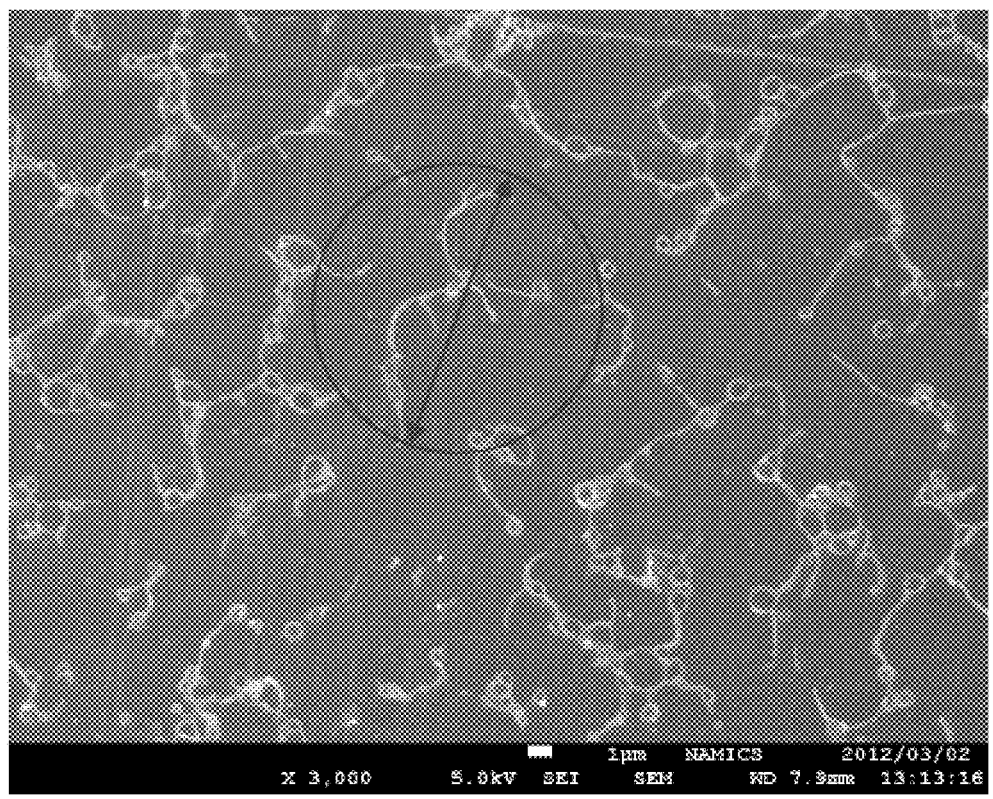
FIG. 4 A photograph of a phase-separated structure of Comparative Example 5 which was taken using a field emission scanning electron microscope.

Analysis of Phase-Separated Structures and Measurement of Fracture Toughness Analysis of phase-separated structures and measurement of fracture toughness values were performed using the same method as in Examples 1-7 and Comparative Examples 1-4. FIG. 1A is a photograph of a phase-separated structure of Example 8 which was taken at 20000× magnification using an FE-SEM. FIG. 1B is a photograph of a phase-separated structure of Example 8 which was taken at 40000× magnification using an FE-SEM. FIG. 2A is a photograph of a phase-separated structure of Example 9 which was taken at 20000× magnification using an FE-SEM. FIG. 2B is a photograph of a phase-separated structure of Example 9 which was taken at 40000× magnification using an FE-SEM. FIG. 3A is a photograph of a phase-separated structure of Example 10 which was taken at 20000× magnification using an FE-SEM. FIG. 3B is a photograph of a phase-separated structure of Example 10 which was taken at 40000× magnification using an FE-SEM. FIG. 4 is a photograph of a phase-separated structure of Comparative Example 5 which was taken at 3000 magnification using an FE-SEM. The circle and the arrow in FIG. 4 show the maximum diameter of the polymer block B.

TABLE 2

| | Ex. 8 | Ex. 9 | Ex. 10 | Comp. Ex. 5 |
|---|---|---|---|---|
| Epoxy resin (YDF-8170) | 100 | 100 | 100 | 100 |
| Epoxy resin curing agent "h" | 44.8 | | | |
| Epoxy resin curing agent "a" | | 44.8 | | |
| Epoxy resin curing agent "i" | | | 44.8 | |
| Amine curing agent (HDAA) | | | | 39.4 |
| Acrylic block copolymer (LA4285) | | | | 5.4 |
| Temperature at which acrylic block copolymer is dissolved (° C.) | | | | 180 |
| Phase-separated structure | micro (FIGS. 1A and 1B) | micro (FIGS. 2A and 2B) | micro (FIGS. 3A and 3B) | macro (FIG. 4) |
| Size (maximum diameter) of polymer block B (nm) | 150 | 200 | 120 | 6500 |
| Fracture toughness value (MPam$^{1/2}$) | 1.4 | 1.6 | 1.5 | 0.8 |

As shown in Table 2, when the epoxy resin was cured using an epoxy resin curing agent obtained by blending an acrylic block copolymer with amine curing agent (Examples 8-10), it had a microphase-separated structure with the size of the polymer block B of 200 nm or less and exhibited a high fracture toughness values. On the other hand, as in Comparative Example 5, when the epoxy resin was blended first with an acrylic block copolymer to which an amine curing agent was added, the resulting cured product did not have a microphase-separated structure (the size of the polymer block B was 6.5 µm in Comparative Example 5), and had a low fracture toughness value.

Comparisons of Optical Transparency

For the aforementioned Example 8 and Comparative Example 5, optical transparency was measured. For the measurement of the optical transparency, test specimens each having 20 mm in length by 10 mm in with by 2 mm in thickness are produced for the epoxy resin cured products of Example 8 and Comparative Example 5. The test specimens were placed on a test chart with a grid pattern to photograph the test specimens. If the test specimen is transparent, the grid pattern of the test chart under the test specimen can be viewed.

Figure 5:
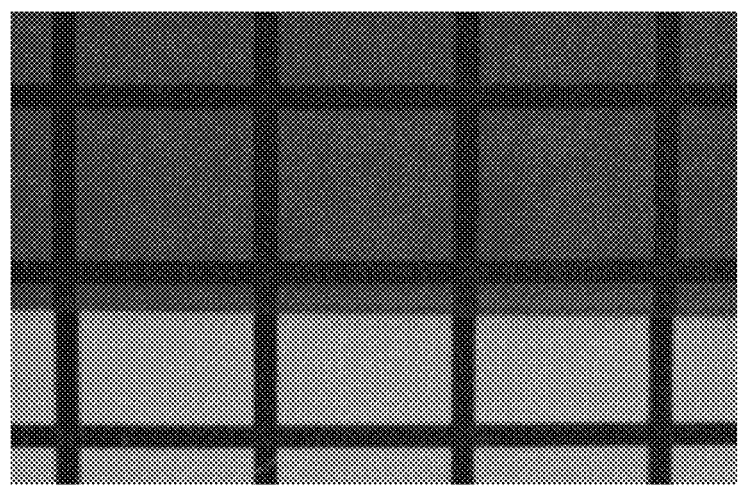
FIG. 5 A photograph of an epoxy resin cured product of Example 8 with visible light irradiated from above.
Figure 6:
FIG. 6 A photograph of an epoxy resin cured product of Comparative Example 5 with visible light irradiated from above.

FIG. 5 is a photograph of the epoxy resin cured product of Example 8 placed on the test chart with visible light irradiated from the upper surface of the product. FIG. 6 is a photograph of the epoxy resin cured product of Comparative Example 5 placed on the test chart with visible light irradiated from the upper surface of the product.

As shown in FIG. 5, the epoxy resin cured product of Example 8 has an optical transparency to visible light. This shows that the size of the phase-separated structure is shorter than the wavelength of visible light, and the epoxy resin cured product having the phase-separated structure has an optical transparency (in other words, an epoxy resin cured product with an optical transparency has a microphase-separated structure).

As apparent from the above Examples and Comparative Examples, by curing the epoxy resin using an epoxy resin curing agent obtained by pre-blending the amine curing agent (A) with the acrylic block copolymer (B), it is possible to produce an epoxy resin cured product having a high toughness and elasticity (which does not impair the desired elasticity).

Structure of Block Copolymers

For the following Examples 11 to 17 and Comparative Examples 6 and 7, a ratio of carboxylic acid content and a ratio of amide compound content were determined, the reactivity was measured, phase-separated structure was observed, and fracture toughness value and the elastic modulus were measured.

Amine curing agent used was either "Kayahard AA" (HDAA) manufactured by Nippon Kayaku Co., Ltd. or diaminodiphenylmethane (DDM) described above.

The acrylic block copolymer used was one of "LA2140e" manufactured by Kuraray Co., Ltd., "LA2250" manufactured by Kuraray Co., Ltd., and "LA4285" manufactured by Kuraray Co., Ltd. described above.

The epoxy resin used was bisphenol-F liquid epoxy resin ("YDF-8170" manufactured by Nippon Steel Sumitomo Metals Co., Ltd.) for all cases.

Example 11

18.7 parts of "LA4285" relative to 100 parts of "Kayahard AA," were placed in a vessel, which was immersed in an oil bath set at 180° C. and the content of the vessel was stirred for 2 hours. Thereafter, the vessel was taken out from the oil bath and cooled to room temperature to prepare an epoxy resin curing agent "j".

46.9 parts of the epoxy resin curing agent "j" was blended with 100 parts of epoxy resin to prepare a liquid epoxy resin composition.

Example 12

18.7 parts of "LA2250" relative to 100 parts of "Kayahard AA" were placed in a vessel, which was immersed in an oil bath set at 190° C. and the content of the vessel was stirred for 4 hours. Thereafter, the vessel was taken out from the oil bath and cooled to room temperature to prepare an epoxy resin curing agent "k".

46.9 parts of the epoxy resin curing agent "k" was blended with 100 parts of epoxy resin to prepare a liquid epoxy resin composition.

Example 13

18.7 parts of "LA2140e" relative to 100 parts of "Kayahard AA" were placed in a vessel, which was immersed in an oil bath set at 180° C. and the content of the vessel was stirred for 8 hours. Thereafter, the vessel was taken out from the oil bath and cooled to room temperature to prepare an epoxy resin curing agent "l".

46.9 parts of the epoxy resin curing agent "l" was blended with 100 parts of epoxy resin to prepare a liquid epoxy resin composition.

Example 14

18.7 parts of "LA2140e" relative to 100 parts of "Kayahard AA" were placed in a vessel, which was immersed in an oil bath set at 190° C. and the content of the vessel was stirred for 4 hours. Thereafter, the vessel was taken out from the oil bath and cooled to room temperature to prepare an epoxy resin curing agent "m".

46.9 parts of the epoxy resin curing agent "m" was blended with 100 parts of epoxy resin to prepare a liquid epoxy resin composition.

Example 15

18.7 parts of "LA2140e" relative to 100 parts of "Kayahard AA" were placed in a vessel, which was immersed in an oil bath set at 190° C. and the content of the vessel was stirred for 8 hours. Thereafter, the vessel was taken out from the oil bath and cooled to room temperature to prepare an epoxy resin curing agent "n".

46.9 parts of the epoxy resin curing agent "n" was blended with 100 parts of epoxy resin to prepare a liquid epoxy resin composition.

Example 16

18.7 parts of "LA2140e" relative to 100 parts of "Kayahard AA" were placed in a vessel, which was immersed in an oil bath set at 190° C. and the content of the vessel was stirred for 16 hours. Thereafter, the vessel was taken out from the oil bath and cooled to room temperature to prepare an epoxy resin curing agent "o".

46.9 parts of the epoxy resin curing agent "o" was blended with 100 parts of epoxy resin to prepare a liquid epoxy resin composition.

Example 17

22 parts of "LA2140e" relative to 100 parts of diaminodiphenylmethane were placed in a vessel, which was immersed in an oil bath set at 190° C. and the content of the vessel was stirred for 1 hour. Thereafter, the vessel was taken out from the oil bath and cooled to room temperature to prepare an epoxy resin curing agent "p".

37.8 parts of the epoxy resin curing agent "p" was blended with 100 parts of epoxy resin to prepare a liquid epoxy resin composition.

Comparative Example 6

100 parts of epoxy resin and 7.4 parts of "LA2140e" were placed in a vessel, which was immersed in an oil bath set at 190° C. and the content of the vessel was stirred for 4 hours. Then, 39.4 parts of "Kayahard AA" were blended to prepare a liquid epoxy resin composition.

Comparative Example 7

100 parts of epoxy resin and 6.8 parts of "LA2140e" were placed in a vessel, which was immersed in an oil bath set at 190° C. and the content of the vessel was stirred for 4 hours. Then, 31 parts of diaminodiphenylmethane were blended to prepare a liquid epoxy resin composition.

Determination of Ratio of Carboxylic Acid Content and Ratio of Amide Compound Content A ratio of carboxylic acid content is a ratio of a carboxylic acid contained in the acrylic block copolymer of the prepared epoxy resin curing agent (mol %). A ratio of an amide compound content is a ratio of an amide compound contained in the acrylic block copolymer of the prepared epoxy resin curing agent (mol %). The proportions of the carboxylic acid and the amide compound were measured using Nuclear Magnetic Resonance (NMR) with the acrylic block copolymer contained in the epoxy resin curing agent. Specifically, the carboxylic acid and the amide compound were silylated and the total amount thereof was measured. Then, the amount of the amide compound was measured using a derivatizing reagent (phenyl isothiocyanate) that selectively reacts with an amino group to determine the amount of the amide compound.

Reactivity Measurement

The reactivity herein refers to a property capable of curing the epoxy resin (a property capable of forming a three-dimensional network structure by cross-linking the epoxy resin and an amine). For example, it is assumed that, when a first epoxy resin curing agent is used, the epoxy resin is cured in a shorter time as compared to the case where the second epoxy resin curing agent is used. In this case, it can be determined that the first the epoxy resin curing agent has a "higher reactivity (shorter reaction time)" in comparison with the second epoxy resin curing agent. For the measurement of the reactivity, an initial (a state immediately after the epoxy resin composition has reached the measurement temperature) viscosity was measured using a viscometer under a temperature condition of 120° C. or 100° C. Thereafter, the viscosity was continuously measured to determine, as the reaction time, the time when the viscosity became 5 times the initial viscosity.

Analysis of Phase-Separated Structures, Measurement of Fracture Toughness Values, and Measurement of Elastic Modulus Analysis of phase-separated structures and measurement of fracture toughness values were performed in a manner similar to those described in conjunction with Examples 1-10 and Comparative Examples 1-5. Measurement of elastic modulus was performed in a manner similar to those described in conjunction with Examples 1-7 and Comparative Examples 1-4.

Figure 8:
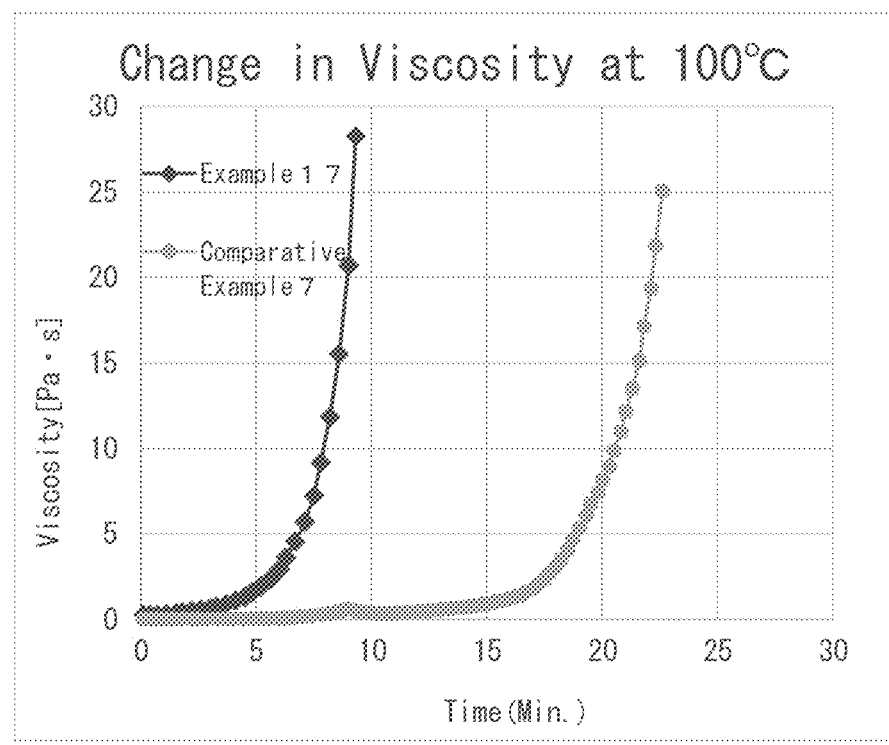
FIG. 8 A graph showing reactivity in Example 17 and Comparative Example 7.

Likewise, as apparent from the graph of FIG. 8, the viscosity was increased (i.e., curing proceeded) in a shorter time after the preparation of the epoxy resin composition in Example 17 as compared with Comparative Example 7.

Since cross-linking of epoxy resins with amines is promoted by carboxylic acid such as methacrylic acid, the reactivity is related to the content of the carboxylic acid. Carboxylic acid content is preferably in the range of 1-8.

Figure 9:
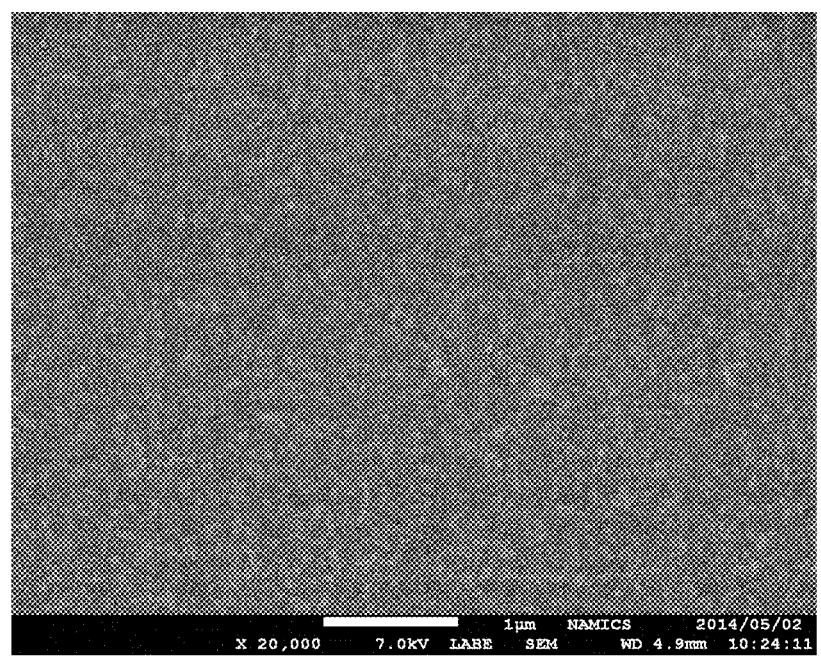
FIG. 9 A photograph of a phase-separated structure of Example 13 which was taken using a field emission scanning electron microscope.
Figure 10:
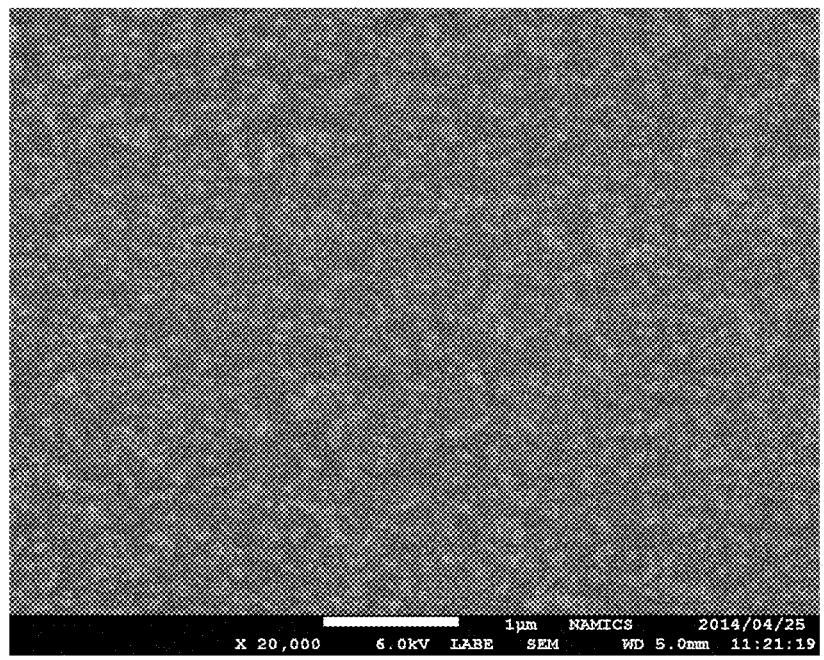
FIG. 10 A photograph of a phase-separated structure of Example 14 which was taken using a field emission scanning electron microscope.

Furthermore, as apparent from Table 3, epoxy resin cured products having a microphase-separated structure, a high toughness, and elasticity (which does not impair the desired elasticity) could be obtained also in Examples 11 to 17. For example, FIG. 9 is a photograph of a phase-separated structure of Example 13 which was taken at 5000× magnification using an FE-SEM. FIG. 10 is a photograph of a phase-separated structure of Example 14 which was taken at 5000× magnification using an FE-SEM. As apparent from FIGS. 9 and 10, the epoxy resin cured products have a microphase-separated structure also in Examples 13 and 14. On the contrary, the epoxy resin cured products in Comparative Examples 6 and 7 have a macrophase-separated structure (see, Table 3).

TABLE 3

|  | Ex. 11 | Ex. 12 | Ex. 13 | Ex. 14 | Ex. 15 | Ex. 16 | Ex. 17 | Comp. Ex. 6 | Comp. Ex. 7 |
|---|---|---|---|---|---|---|---|---|---|
| Epoxy resin (YDF-8170) | 100 | 100 | 100 | 100 | 100 | 100 | 100 | 100 | 100 |
| Epoxy resin curing agent "j" (180° C./2 h) | 46.9 | | | | | | | | |
| Epoxy resin curing agent "k" (190° C./4 h) | | 46.9 | | | | | | | |
| Epoxy resin curing agent "l" (180° C./8 h) | | | 46.9 | | | | | | |
| Epoxy resin curing agent "m" (190° C./4 h) | | | | 46.9 | | | | | |
| Epoxy resin curing agent "n" (190° C./8 h) | | | | | 46.9 | | | | |
| Epoxy resin curing agent "o" (190° C./16 h) | | | | | | 46.9 | | | |
| Epoxy resin curing agent "p" (190° C./1 h) | | | | | | | 37.8 | | |
| Amine curing agent (HDAA) | | | | | | | | 39.4 | |
| Amine curing agent (DETDA) | | | | | | | | | 31 |
| Acrylic block copolymer (LA4285) | | | | | | | | | |
| Acrylic block copolymer (LA2250) | | | | | | | | | |
| Acrylic block copolymer (LA2140e) | | | | | | | | 7.4 | 6.8 |
| Phase-separated structure | micro | micro | micro | micro | micro | micro | micro | macro | macro |
| Ratio of carboxylic acid content (mol. %) | 1.2 | 2.6 | 2.2 | 2.4 | 4.4 | 6 | 4.7 | 0.0 | 0.0 |
| Ratio of amide compound content (mol. %) | 0.2 | 0.7 | 0.6 | 0.7 | 1.4 | 1.6 | 1.2 | 0.0 | 0.0 |
| Elasticity (Gpa) | 3.7 | 3.6 | 3.7 | 3.6 | 3.6 | 3.6 | 3.9 | 2.0 | 2.8 |
| Fracture toughness value (MPam$^{1/2}$) | 1.5 | 1.4 | 1.4 | 2.3 | 1.5 | 1.3 | 1.9 | 0.9 | 1.0 |
| Reaction time at 120° C. (min.) | 24 | 15.5 | 17 | 17 | 11 | 8 | — | 27.5 | — |
| Reaction time at 100° C. (min.) | — | — | — | — | — | — | 4.5 | — | 7 |

* Values indicated next to the epoxy resin curing agent "j" to the epoxy resin curing agent "p" are the temperature and time to dissolve each epoxy resin curing agent into an amine.

The ratios of carboxylic acid content and the ratio of amide compound content in the Examples and Comparative Examples are as shown in Table 3.

As apparent from Table 3, the reaction time was shorter (higher in reactivity) in Examples 11 to 16 than in Comparative Example 6. In addition, the reaction time was shorter (higher reactivity) in Example 17 than in Comparative Example 7.

Figure 7:
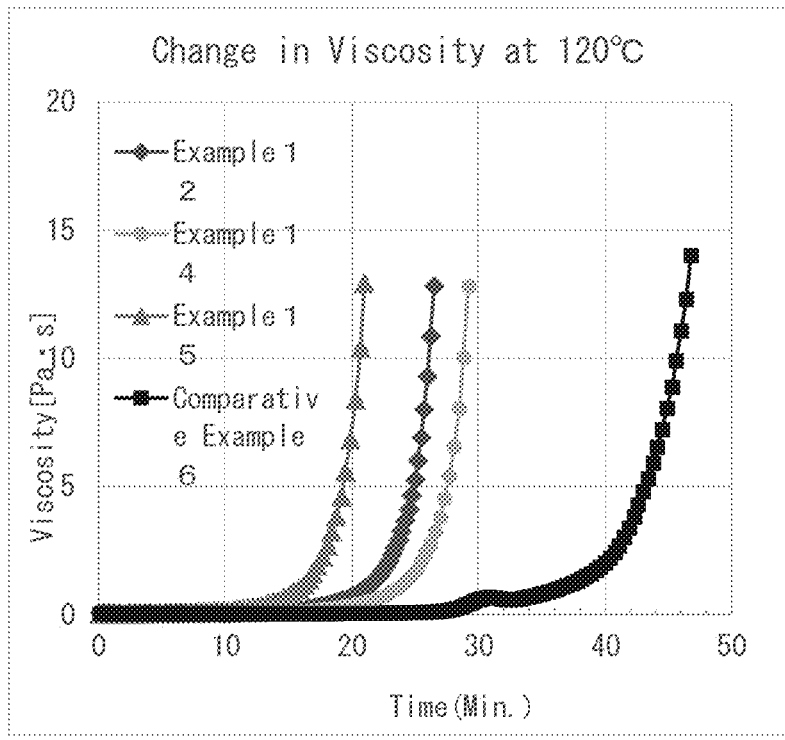
FIG. 7 A graph showing reactivity in Examples 12, 14, and 15, and Comparative Example 6.

FIG. 7 is a graph showing reactivity (reaction time) in Examples 12, 14, and 15 and Comparative Example 6 at a temperature of 120° C. FIG. 8 is a graph showing reactivity (reaction time) in Example 17 and Comparative Example 7 at a temperature of 100° C. In both graphs, the vertical axis represents viscosity and the horizontal axis represents elapsed time.

As apparent from the graph of FIG. 7, the viscosity was increased (i.e., curing proceeded) in a shorter time after the preparation of the epoxy resin composition in Examples 12, 14, and 15 as compared with Comparative Example 6.

FIG. 7
Change in Viscosity at 120° C.
Viscosity
Example 12
Example 14
Example 15
Comparative Example 6
Time (Min.)
FIG. 8
Change in Viscosity at 100° C.
Viscosity
Example 17
Comparative Example 7
Time (Min.)

The invention claimed is:
1. A method of producing an epoxy resin cured product having a micro phase-separated structure, obtained by curing an epoxy resin composition comprising an epoxy resin E and an epoxy resin curing agent comprising:

dissolving 1 to 100 parts of an acrylic block copolymer (B) in 100 parts of an aromatic diamine curing agent (A) at 170° C. to 200° C. for 1 to 16 hours, hydrolyzing a part of the acrylic block copolymer (B) to produce a —COOH group in the acrylic block copolymer (B), and dehydrating the produced —COOH group and a —NH2 group of the aromatic diamine curing agent to produce the epoxy resin curing agent comprising a modified block copolymer (B):

wherein the acrylic block copolymer (B) comprises a polymer block A (C) selected from the group consisting of poly(methyl methacrylate), poly(ethyl methacrylate), poly (propyl methacrylate), poly(n-butyl methacrylate), and poly(glycidyl methacrylate); and wherein the modified acrylic block copolymer (B) comprises (1) a —COOH group resulting from hydrolysis a part of the polymer block A(C), and (2) an amide group resulting from dehydration between the —COOH group of (1) and a —NH$_2$ group of the aromatic diamine curing agent;

mixing the epoxy resin curing agent with the epoxy resin to obtain the epoxy resin composition; and curing the epoxy resin composition to produce the epoxy resin cured product having a micro phase-separated structure.

2. The method according to claim 1, wherein the aromatic diamine curing agent (A) is diaminodiphenylmethane (4,4'-methylenedianiline, MDA), m-phenylenediamine (MPDA), diaminodiphenyl sulfone (DDS), diethyltoluenediamine (DETDA), diaminodiphenylmethane (DDM), 3,3'-diethyl-4,4'-diaminodiphenylmethane trimethylenebis(4-aminobenzoate), polytetramethylene oxide-di-P-aminobenzoate, methylenebis(2-ethyl-6-methylaniline), 4,4'-methylenebis(2,6-dimethylaniline), 4,4'-methylenebis(2,6-diethylaniline) or mixture thereof.

3. The method according to claim 1, wherein the block copolymer (B) is a diblock copolymer of the polymer block A (C)-a polymer block B (D), or a tribrock copolymer of the polymer block A (C)-a polymer block B (D)-the polymer block A (C).

4. The method according to claim 3, wherein the polymer block B (D) is poly(ethyl acrylate), poly(n-butyl acrylate), poly(octyl acrylate), or poly(2-ethylhexyl acrylate).

5. An epoxy resin cured product having a micro phase-separated structure, obtained by curing an epoxy resin composition comprising an epoxy resin (E) and an epoxy resin curing agent comprising an aromatic diamine curing agent (A), an acrylic block copolymer (B), and a modified acrylic block copolymer (B); the epoxy resin curing agent being obtained by dissolving 1 to 100 parts of an acrylic block copolymer (B) in 100 parts of an aromatic diamine curing agent (A) at 170° C. to 200° C. for 1 to 16 hours, hydrolyzing a part of the acrylic block copolymer (B) to produce a COOH group in the acrylic block copolymer (B), and dehydrating the produced —COOH group and a —NH2 group of the aromatic diamine curing agent to produce the epoxy resin curing agent;

wherein the acrylic block copolymer (B) comprises a polymer block A (C) selected from the group consisting of poly(methyl methacrylate), poly(ethyl methacrylate), poly(propyl methacrylate), poly(n-butyl methacrylate), and poly(glycidyl methacrylate); and wherein the modified acrylic block copolymer (B) comprises (1) a —COOH group resulting from hydrolysis of a part of the polymer block A(C), and (2) an amide group resulting from dehydration between the —COOH group of (1) and an —NH$_2$ group of the aromatic diamine curing agent.

6. The epoxy resin cured product according to claim 5, wherein the aromatic diamine curing agent (A) is diaminodiphenylmethane (4,4'-methylenedianiline, MDA), m-phenylenediamine (MPDA), diaminodiphenyl sulfone (DDS), diethyltoluenediamine (DETDA), diaminodiphenylmethane (DDM), 3,3'-diethyl-4,4'-diaminodiphenylmethane trimethylenebis(4-aminobenzoate), polytetramethylene oxide-di-P-aminobenzoate, methylenebis(2-ethyl-6-methylaniline), 4,4'-methylenebis(2,6-dimethylaniline), 4,4'-methylenebis(2,6-diethylaniline) or mixture thereof.

7. The epoxy resin cured product according to claim 5, wherein the block copolymer (B) is a diblock copolymer of the polymer block A (C)-a polymer block B (D), or a tribrock copolymer of the polymer block A (C)-a polymer block B (D)-the polymer block A (C).

8. The epoxy resin cured product according to claim 7, wherein the polymer block B (D) is poly(ethyl acrylate), poly(n-butyl acrylate), poly(octyl acrylate), or poly(2-ethylhexyl acrylate).

\* \* \* \* \*